United States Patent [19]

Grunberg et al.

[11] Patent Number: 5,029,683

[45] Date of Patent: Jul. 9, 1991

[54] GEAR POSITION DETECTOR FOR THE CONTROL OF A CLUTCH ASSOCIATED WITH A GEARBOX

[75] Inventors: Pierre Grunberg, Paris; Christian Pankowiak, Saint-Ouen; Alain Taquoy, Beaurieux, all of France

[73] Assignee: Valeo, Paris, France

[21] Appl. No.: 480,070

[22] Filed: Feb. 14, 1990

[30] Foreign Application Priority Data

Feb. 17, 1989 [FR] France ................... 89 02077

[51] Int. Cl.⁵ ............... B60K 41/22; B60K 20/04
[52] U.S. Cl. ................... 192/3.55; 192/3.62; 192/3.63; 74/473 R; 200/61.88
[58] Field of Search ............ 192/3.51, 3.54, 3.55, 192/3.61, 3.62, 3.63; 74/473 R; 200/61.88, 61.91

[56] References Cited

U.S. PATENT DOCUMENTS

| | | | |
|---|---|---|---|
| 3,910,388 | 10/1975 | Moori et al. | 200/61.88 X |
| 4,344,514 | 8/1982 | Fujihara et al. | 192/3.62 X |
| 4,625,840 | 12/1986 | Kojima et al. | 192/3.61 X |
| 4,676,350 | 6/1987 | Shinokawa et al. | 192/3.62 |
| 4,723,642 | 2/1988 | Grunberg et al. | 192/3.55 |

FOREIGN PATENT DOCUMENTS

| | | |
|---|---|---|
| 0186573 | 7/1986 | European Pat. Off. . |
| 0189338 | 7/1986 | European Pat. Off. . |
| 2559719 | 8/1985 | France . |
| 2075621 | 11/1981 | United Kingdom . |

OTHER PUBLICATIONS

"Electronic Actuator Eliminates Clutch Pedal." *Automative Engineering*, vol. 92, No. 10 (Oct. 1984), pp. 81–85.

*Primary Examiner*—Richard Lorence
*Attorney, Agent, or Firm*—Charles A. Brown

[57] ABSTRACT

The invention proposes a detection device including a selector linkage with a gear change lever, with which are associated a force threshold detector, a first analog position detector connected to gear shift means, and a circuit for firstly activating an automatic clutch actuating system and secondly processing information received by the threshold detecting means and the first detector. A second analog position detector is connected to line selector and is responsive to information applied to the gear change lever, the second detector being connected to the processing and control circuit.

2 Claims, 1 Drawing Sheet

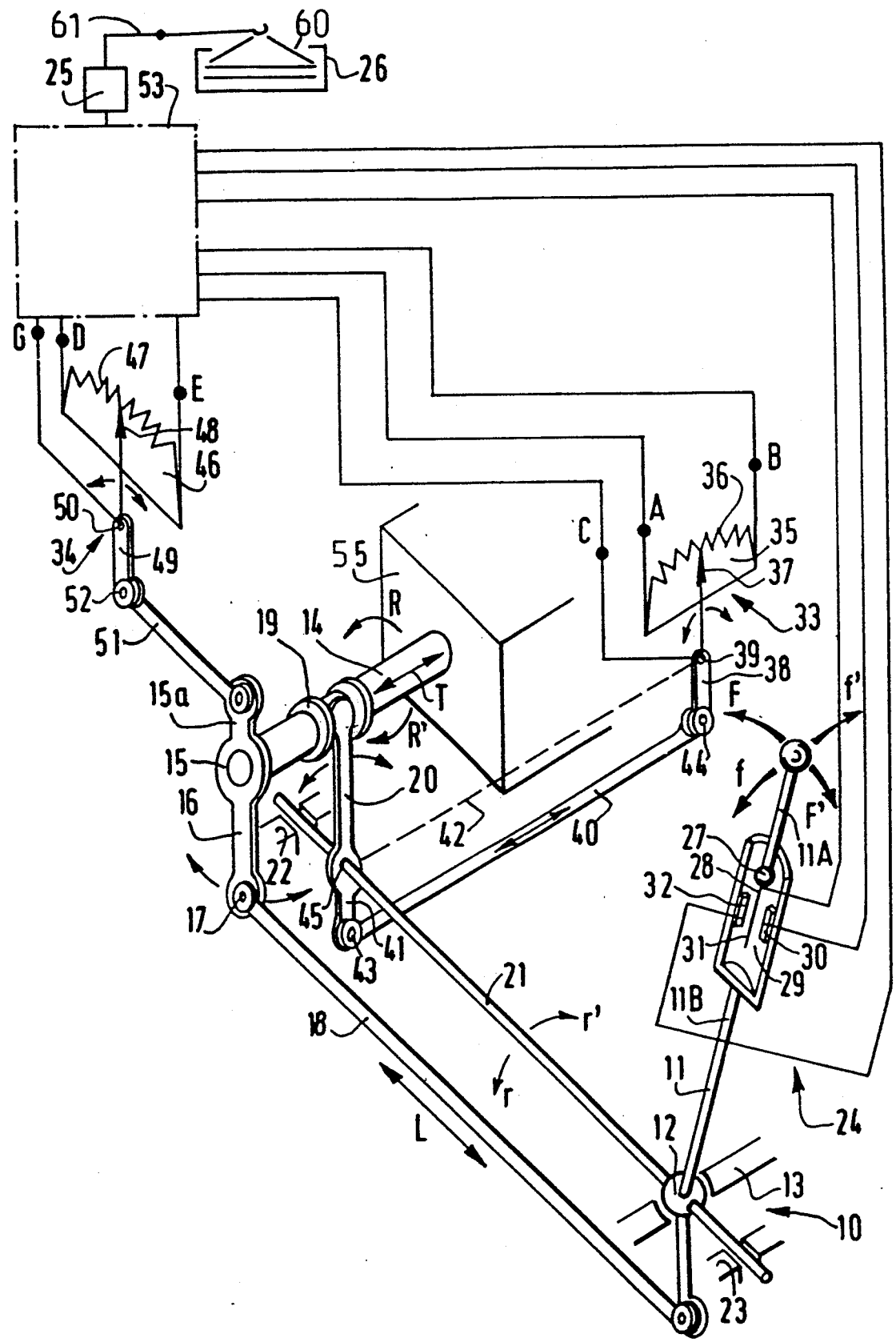

GEAR POSITION DETECTOR FOR THE CONTROL OF A CLUTCH ASSOCIATED WITH A GEARBOX

FIELD OF THE INVENTION

The present invention is concerned with a control system for a gearbox of the stepped gear ratio type, in particular for automotive vehicles, the control system including a gear selector linkage which is adapted to control an automatic actuating system for a clutch which is associated with the gearbox.

BACKGROUND OF THE INVENTION

A selector linkage of this kind is described in U.S. Pat. No. 4,723,642, and is also adapted to operate a gear shift means and a line selection means so as to manoeuvre shift wheels (sliding pinions) in the gearbox. Also provided are: force threshold detecting means for detecting the thresholds of forces exerted on the selector linkage; an analog position detector, which is connected to the gear shift means and which is responsive to gear shift information applied to the gear change control lever, the latter being arranged at the "upstream" end of the selector linkage; and a processing and control circuit for, firstly, activating the automatic actuating system for the clutch, and secondly for processing data received by the said force threshold detecting means and by the analog position detector.

In the above mentioned U.S. patent specification, it is possible to detect whether a matched or an unmatched speed is engaged. This state of parity is representative of the position of the gear shift means, the speeds varying according to which of its limit positions is occupied by the gear shift means, such a device comprising an element which constitutes a fixed cam on a gear shift selector shaft and operating, in the limit positions, two feelers which control the operation of electrical contacts connected to the processing circuit. In a variant, an analog position detector that includes a potentiometer is used.

Although such an arrangement indicates whether the speed engaged is matched or unmatched, it does not indicate which speed, that is to say the level at which the line selection means are set.

It is also known, from the periodical "Automotive Engineering" for October 1984, to provide a device which indicates what gear ratio is engaged, by means of a detector for detecting the demultiplication ratio of the gearbox, the device comprising at least two sensors for rotational speed, one of which is responsive to the rotational velocity of the gearbox output shaft, while the other is responsive to the rotational velocity of the gearbox input shaft.

In order to fit sensors in such a device, modifications of the gearbox casing are necessary, and this involves additional machining operations. In addition, such a device will only indicate what gear ratio is engaged at a given moment if the gears are actually rotating, since the information is received on rotating elements.

It is however essential, if automatic operation of the clutch is to be soundly based, that the actual gear ratio engaged be known at any instant, whether the gears are in rotation or not. Indeed, a speed may be engaged when the vehicle is stationary; and it is accepted practice, for example, to give a warning indication to the driver if he tries to start off in third gear.

SUMMARY OF THE INVENTION

The object of the present invention is to respond to these requirements, and thus to improve the basis of the automatic operation of the clutch.

To this end, according to the invention, a control system for a gearbox, of the type set out above, is characterised in that it further includes a second analog position detector which is connected to the line selection means and which is responsive to data about line selection applied to the gear change control lever, the second detector being connected to the processing and control circuit.

It will be appreciated that the analog position detectors are easy to mount in position, and are more easily adjustable than an arrangement involving cam and feelers in accordance with the prior art in that the latter operates in a discontinuous manner, by contrast with the detector according to the invention, which operates continuously. The invention makes it possible to distinguish matched gear ratios, i.e. those having a common parity, for example first gear and third gear. It is possible to disengage the clutch when the gear change control lever is moved in translational movement towards an unoccupied limit position, or when it lies on the neutral selection line. It is also possible to enable the clutch sequence to take place when one speed is seen to be engaged.

In one particular embodiment of the invention, the first and second position detectors comprise two potentiometers, in each of which the cursor is displaceable along the resistor in response to a rotation or to movement of the gear change control level in translation. The cursors are arranged on appropriate axes, with the output voltage of the potentiometers being representative of the position of the gear change control lever.

It will be appreciated that this arrangement is a very simple one, the cursor of one of the two potentiometers being able to be driven from a fork which allows the line selection means to be actuated, while the other cursor is driven from a wheel which allows the gear shift means to be actuated.

The description which follows, and which is given with reference to the accompanying drawing, will afford a better understanding as to how the invention may be applied in practice.

BRIEF DESCRIPTION OF THE DRAWINGS

The single FIGURE of the drawings is a perspective diagram giving a general view of a control device for the gearbox of an automotive vehicle, associated with a dry clutch under the control of an automatic clutch actuating system.

DESCRIPTION OF A PREFERRED EMBODIMENT OF THE INVENTION

The drawing shows, in diagrammatic form, a gear selector linkage 10 which includes a manual gear change control lever 11 for selecting different gear ratios in a gearbox 55. For convenience, in this description the relative positions of components in the system will be referred to where appropriate as being upstream when nearer to the lever 11 and downstream when nearer to the gearbox 55. The manual control lever 11 is thus at the upstream end of the gear selector linkage 10, and is mounted for oscillating movement about a rotary joint 12, with respect to a fixed chassis 13. The term "gear shift", as used in this description, corresponds for example to a change from first gear to second gear, and the term "line selection" corresponds for example to a displacement from the line of speeds 1, 2 to the line of speeds 3, 4. The gear change lever 11 controls, downstream thereof, both a gear shift means and a line selection means, both of which in this example include a common control shaft 14 of the gearbox 55. The shaft 14 is arranged to be rotated, in the direction of the arrows R and R', between end positions for effecting the gear shifts, this rotation being actuated through a transverse wheel 15 at the end of an arm 16. A first actuating rod 18 is connected to the wheel 15 via a pivot 17, which is moved axially along the line L under the influence of the gear change lever 11 when the latter is moved in the direction indicated by the arrows F, F'.

The control shaft 14 is also arranged to be controlled in axial translational movement in the direction of the arrow T, for the purpose of selecting an appropriate line of speeds, by means of a groove 19 formed on the shaft 14 and in which an actuating member 20 is received. In this example the actuating member 20 is in the form of a fork which oscillates under the rotative action of a second actuating rod 21 as indicated by the arrows r, r'. The actuating member 20 and actuating rod 21 are fixed to each other. The rod 21 is guided at its ends by means of fixed bearings 22, 23 of the chassis, and is actuated by operation of the gear change lever 11 in the direction of the arrows f, f'. The control shaft 14 is adapted in the conventional way to shift the shift wheels or sliding pinions of the gearbox so as to give different gear ratios, these pinions being part of synchromesh mechanisms.

Force threshold detecting means 24 are associated with the gear selector linkage 10 in the manner described in U.S. Pat. No. 4,723,642, and are adapted to provide data to a processing and control circuit 53. In this example, the circuit 53 is in the form of an electrical computer, for example a micro-processor, for controlling an automatic actuating system 25. The actuating system 25 is adapted to control the disengagement or engagement of a clutch indicated diagrammatically at 26, so as to permit any change of gear ratio, and starting of the vehicle, to take place.

The detecting means 24 comprise a deformable element of the linkage, which is visible to the driver and which responds to the driver's wishes. To this end, the detecting means 24 include the control lever 11 which is itself deformable, being of the kind referred to as a polarised control lever. The lever 11 includes an upstream or upper lever member 11A adapted to be manipulated by the driver, and a downstream of lower lever member 11B which is pivotally mounted on the chassis. The lever members 11A and 11B allow relative angular displacement to take place between them, by means of a pivot 27, the axis of which is orientated in the direction of line selection. The upper lever member 11A includes a finger 28, which extends within a housing 29 carried by the lower lever member 11B.

Thus the lever 11 carries the detecting means 24, with the latter being adapted to assume a state which represents the movement of the gear change control lever, and which depends on whether the latter is moved in one, or in the other, of two opposed reference directions. These reference directions are those indicated by the arrows F, F'.

The detecting means 24 also include three circuit breaker contacts 30, 31 and 32 which together form a three-wire or double pole circuit breaker adapted to make contact selectively at 30, 31 and 31, 32. The contact 31 is carried by the finger 28 of the upper lever member 11A, while the contacts 30 and 32 are arranged in the housing 29, symmetrically on either side of the contact 31.

The lever members 11A and 11B are coupled resiliently through a means which biasses them towards a neutral configuration in which they are in alignment with each other. The circuit breaker 30 to 32 can assume three states, namely a first state in which the upper lever member 11A undergoes little or no force, and in which the contacts are all separated from each other; a second state in which the lever member 11A is urged in the direction of the arrow F', and in which the contacts 31 and 32 are closed together; and a third state in which the lever member 11A is urged in the direction of the arrow F, and in which the contacts 30 and 31 are closed together.

The clutch 26 is for example a dry clutch having a diaphragm 60, a cover plate, a reaction plate and a friction disc. The cover plate is carried by and fixed on the reaction plate, and the diaphragm bears on the cover plate, the pressure plate being fixed with respect to the cover plate for rotation therewith. The friction disc is fixed with respect to the input shaft of the gearbox, for rotation with the latter. The diaphragm urges the pressure plate in a direction such that the friction disc is gripped between the reaction plate and the pressure plate. When the friction disc is fully gripped between the reaction and pressure plates, the clutch is engaged, being disengaged when not so gripped. Control of the clutch is achieved through an electrical actuating device, which is part of the actuating system 25 and which is provided with a compensating spring controlled by the computer 53. The actuating device actuates a transmission, part of which consists of a declutching fork 61, which acts on a declutching member for operating the diaphragm 60. For more details of this arrangement, reference is made for example to the above mentioned article in "Automotive Engineering".

The control system also includes a first analog position detector 34, which is connected to the gear shift means 14–18, and which is responsive to gear shift data applied to the gear change control lever 11. The circuit 53 allows the automatic clutch actuating system 25 to be activated, and also allows information received by the force threshold detecting means 24 and by the first analog position detector 34 to be processed.

The control system also includes a second analog position detector 33, which is connected to the line selection means 14, 19–21. The detector 33 is responsive to line selection data applied to the gear change control lever 11, and is, like the first analog position detector 34, connected to the processing and control circuit 53.

The analog position detectors 33 and 34 are responsive, regardless of the state of the gearbox 55, to movement in the linkage 10 as follows. The detector 33 is responsive to the rotation r, r' of the actuating rod 21 operated by the lever 11 when the latter is moved in the direction of the arrows f, f', so as to move the shaft 14 axially in translational movement T for selection of a line of speeds. The detector 34 is responsive to the longitudinal displacement L of the actuating rod 18 when the lever 11 is moved in the direction of the arrows F, F', so as to cause the shaft 14 to rotate in the direction R or R' to effect a gear shift. Each of the position detectors 33 and 34 is connected to the circuit 53 electrically through three lines, while the contacts 30 to 32 of the detecting means 24 are connected to it via three further lines.

In this example, the second position detector 33 comprises a potentiometer 35 (referred to herein, where appropriate, as the second potentiometer), having a resistor 36 with terminals A, B to which a reference voltage is applied. A cursor 37 is displaceable along the resistor 36 in response to movement in the direction of the arrows f, f' of the gear change lever 11 corresponding to an axial movement T of the gearbox control shaft 14. The potential difference between the terminal C of the cursor and the terminal A or B represents the position of the cursor 37, which is actuated in angular displacement about a fixed pivot axis 39 of an arm 38 which is fixed with respect to the cursor. The arm 38 is one element of a deformable parallelogram, a second element of which consists of a drive rod 40. The third element of the parallelogram is a control arm 41, while its fourth element is an imaginary line 42. The parallelogram is articulated about four points, namely the fixed pivot axis 39, a pivot point 45 with a fixed axis, and moveable points 43 and 44. The pivot point 45 is in fact identical with the point at which the rotatable actuating rod 21 is fixed to the actuating member or fork 20, while the control arm 41 mentioned above is an extension of the fork 20 beyond the point 45.

The first analog position detector 34 comprises another potentiometer 46 (referred to where appropriate as the first potentiometer), which includes a resistor 47 with terminals D, E to which a voltage is applied. A cursor 48 is displaceable along the resistor 47 in response to movement of the gear change lever 11 in the direction of the arrows F, F', corresponding to rotation of the control shaft 14 in the direction R or R'. The potential difference between the terminal G of the cursor 48 and the terminal D or E represents the position of the cursor 48. The latter has an extension arm 49, which moves the cursor rotatably about a fixed pivot point 50. The arm 49 is itself actuated by longitudinal movement of a second arm 51 which is connected at one of its ends to the arm 49 through a pivot 52, being connected at its other end to an extension 15a of the transverse wheel 15. The wheel 15 is rotated in the manner described above by the control shaft 14 to which it is secured, when the actuating rod 18 is moved longitudinally in the appropriate direction L according to the direction of the force applied when the gear change lever is moved in the direction F or F'.

The processing and control circuit 53 is adapted, as a function of the position of the detectors 33 and 34 and of the force threshold detecting means 24, to activate the automatic actuating system 25 for the clutch 26 in order to disengage the latter ready for a gear change operation, followed by reengagement of the clutch 26 when a new gear has been engaged. It will be noted that the circuit 53 is thus adapted to activate the system 25 in such a way as to disengage the latter when the gear change lever 11 is moved in a translational sense towards an unoccupied limit position, or when it lies on the neutral selection line.

In this way, the detecting means 24 enable the requirement for disengagement of the clutch to be detected, while the detectors 33 and 34 allow the gear that is engaged to be identified, in such a way that it is possible—in particular due to the circuit 53—to device a method of operation that allows normal or exceptional starting in first gear to be distinguished from an attempt to start in a higher gear. This will produce an alarm signal or a signal to give a warning that the vehicle is being misused. It will be noted that it is also possible to improve the driver's comfort, in that a change, for example, from third gear down to second gear can be made with a longer delay before re-engagement of the clutch than in the case of a change up from second to third gear. This is possible because the arrangment allows the actual speed ratios that are being engaged to be identified. In a modified embodiment, not shown, the potentiometers of the detectors 34 and 33 are arranged within the gearbox 55 itself, at the end of the control shaft 14. In a further embodiment, again not shown, these two potentiometers are mechanically grouped in the form of a single sensor at the level of the free end of the control shaft 14, and are sensitive respectively to rotational displacement and translational movement of the control shaft. The number of electrical connecting wires can then be reduced to four by connecting the two potentiometers in parallel with each other.

The potentiometer 47 of the detector 34 can of course be replaced, for example, by an analog position detector that includes a Hall effect sensor or an optical sensor. Similarly, the gear shift means and line selection means may include two different shafts, one being rotatable and the other moveable axially in translational movement.

What is claimed is:

1. A control system for a gearbox of the stepped gear ratio type in association with a clutch, wherein said control system comprises: automatic clutch actuating means for the clutch; means coupling said clutch actuating means with the clutch; a processing and control circuit connected with said clutch actuating means for controlling the latter; and a gear selector linkage comprising a gear change control lever, gear shift means coupled between said gear control lever and the gearbox for changing gear between one speed ratio and the next, line selection means coupled between said gear control lever and the gearbox for selecting a line of speeds in the gearbox, and force threshold detecting means for detecting forces exerted on said gear control lever, said control system further comprising: a first analog position detector connected to said gear shift means for actuation by the latter; a second analog position detector connected to said line selection means for actuation by the latter; and electrical connecting means coupling said processing and control circuit with, respectively, said force threshold detecting means, said first position detector and said second position detector, whereby said processing and control circuit can receive data as to the forces, together with gear shift data and line selection data, so as to process the data and control the clutch actuating means in response thereto, each said position detector comprising a potentiometer having a resistor, a cursor engaging the resistor, and means mounting said cursor for displacement along the resistor, said cursor mounting means of said first detector being moveable by said gear shift means and that of said second detector by said line selection means, whereby each potentiometer can deliver an output voltage representing the position of said gear control lever in regard to, respectively, said gear shift and the line selection.

2. A system according to claim 1, in which said gear shift means and the line selection means include a common control shaft having a peripheral groove, the line selection means including a fork engaged in said groove so as to displace the shaft in translation, said second analog position detector is coupled with said fork to be driven thereby.

* * * * *